(12) United States Patent
Wang et al.

(10) Patent No.: US 10,386,689 B2
(45) Date of Patent: Aug. 20, 2019

(54) DISPLAY PANEL, MANUFACTURING METHOD THEREOF AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhidong Wang, Beijing (CN); Yun Qiu, Beijing (CN); Yanfeng Wang, Beijing (CN); Zhenhua Lv, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 43 days.

(21) Appl. No.: 15/682,226

(22) Filed: Aug. 21, 2017

(65) Prior Publication Data
US 2018/0088427 A1  Mar. 29, 2018

(30) Foreign Application Priority Data

Sep. 29, 2016 (CN) .......................... 2016 1 0868535

(51) Int. Cl.
| | | |
|---|---|---|
| *G02F 1/155* | (2006.01) | |
| *G02F 1/157* | (2006.01) | |
| *G02F 1/153* | (2006.01) | |
| *G02F 1/1333* | (2006.01) | |

(52) U.S. Cl.
CPC .......... *G02F 1/155* (2013.01); *G02F 1/13336* (2013.01); *G02F 1/157* (2013.01); *G02F 1/1533* (2013.01); *G02F 2001/1536* (2013.01)

(58) Field of Classification Search
CPC .......... G02F 1/155; G02F 1/1533; G02F 1/157
See application file for complete search history.

(56) References Cited

U.S. PATENT DOCUMENTS

2012/0268696 A1  10/2012  Yim et al.
2017/0194392 A1   7/2017  Wang et al.

FOREIGN PATENT DOCUMENTS

| CN | 102759834 A | 10/2012 |
|---|---|---|
| CN | 104216177 A | 12/2014 |
| CN | 105633121 A |  6/2016 |
| JP | 2001215499 A |  8/2001 |

OTHER PUBLICATIONS

First Office Action for Chinese Application No. 201610868535.X, dated Apr. 25, 2017, 6 Pages.
Search Report for Chinese Application No. 201610868535.X, dated Feb. 16, 2017, 6 Pages.

*Primary Examiner* — Jack Dinh
(74) *Attorney, Agent, or Firm* — Brooks Kushman P.C.

(57) ABSTRACT

The present disclosure provides a display panel, including: a base substrate; a plurality of hemispherical grooves arranged in the base substrate, a reflective material having a refractive index substantially greater than the base substrate being filled in each of the plurality of hemispherical grooves; and at least one electrochromic unit arranged on the base substrate with the reflective material. Each of the at least one electrochromic unit includes two transparent electrodes and an electrochromic material arranged between the two transparent electrodes.

20 Claims, 7 Drawing Sheets

DISPLAY PANEL, MANUFACTURING METHOD THEREOF AND DISPLAY DEVICE

CROSS-REFERENCE TO RELATED APPLICATION

The present application claims priority to Chinese patent application No. 201610868535.X filed on Sep. 29, 2016, which is incorporated herein by reference in its entirety.

TECHNICAL FIELD

The present disclosure relates to the field of display technology, in particular to a display panel, a manufacturing method thereof, and a display device.

BACKGROUND

Along with the development of the display technology, various products having a display function, e.g., mobile phones, flat-panel computers, televisions, displays, laptop computers, digital photo frames and navigators, have emerged in our daily lives, and these products are each equipped with a display panel. Due to its advantages, such as low production cost and high reflectivity, a reflective display panel has become a research hotspot in the display field.

In the related art, the reflective display panel usually includes a carrying glass substrate, a hemispherical reflective film, an upper electrode, an ink with black charged particles, a lower electrode and a driving back plate. The hemispherical reflective film and the upper electrode are sequentially arranged on the glass substrate, the upper electrode is arranged opposite to the lower electrode, and the ink with the black charged particles are filled between the upper electrode and the lower electrode. In the case that a negative voltage is applied to the upper electrode and a positive voltage is applied to the lower electrode, the negatively-charged particles may be attracted and attached to a position in the vicinity of the lower electrode. In the case that an incident light beam enters the display panel through the carrying glass substrate, it may be transmitted through an optically denser medium (the hemispherical reflective film and the upper electrode) and enter an optically thinner medium (the ink). At this time, the incident light beam may be totally reflected, and the display panel may be in a bright state. On the other hand, in the case that the positive voltage is applied to the upper electrode and the negative voltage is applied to the lower electrode, the negatively-charged particles may be attracted and attached to a position in the vicinity of the upper electrode, so as to cover the upper electrode on the hemispherical reflective film. In the case that the incident light beam enters the display panel through the carrying glass substrate, it may be adsorbed by the black charged particles. At this time, the display panel may be in a dark state.

For the conventional reflective display panel, it is necessary to form the hemispherical reflective film on the carrying glass substrate through nanoimprint lithography, and then form the upper electrode on the hemispherical reflective film, resulting in a difficult and complex manufacturing process.

SUMMARY

An object of the present disclosure is to provide a display panel, a manufacturing method thereof and a display device, so as to reduce the difficulty in the manufacture and simplify the manufacturing process.

In one aspect, the present disclosure provides in some embodiments a display panel, including: a base substrate; a plurality of hemispherical grooves arranged in the base substrate; a reflective material having a refractive index substantially greater than the base substrate being filled in each of the plurality of hemispherical grooves; and at least one electrochromic unit arranged on the base substrate with the reflective material. Each of the at least one electrochromic unit includes two transparent electrodes and an electrochromic material arranged between the two transparent electrodes.

In one possible embodiment of the present disclosure, the at least one electrochromic unit includes a plurality of electrochromic units arranged in an array form on the base substrate with the reflective material.

In one possible embodiment of the present disclosure, the transparent electrodes of the plurality of electrochromic units at one side of the electrochromic material are electrically connected to each other, and the transparent electrodes at the other side of the electrochromic material are spaced apart from each other.

In one possible embodiment of the present disclosure, the transparent electrodes of the plurality of electrochromic units at the one side of the electrochromic material are formed integrally.

In one possible embodiment of the present disclosure, any two of the plurality of electrochromic units are spaced apart from each other.

In one possible embodiment of the present disclosure, in the case of being in a nontransparent state, the electrochromic material is black.

In one possible embodiment of the present disclosure, a protection layer is further arranged on the base substrate with the at least one electrochromic unit.

In one possible embodiment of the present disclosure, the reflective material is zinc oxide, or a composite material of zinc oxide and sulfur.

In another aspect, the present disclosure provides in some embodiments a display device including the above-mentioned display panel.

In one possible embodiment of the present disclosure, the display device further includes a preposed light source arranged at a light-entering side of the display panel and at least one end of the display panel.

In yet another aspect, the present disclosure provides in some embodiments a method for manufacturing a display panel, including steps of: forming a plurality of hemispherical grooves in a base substrate; filling a reflective material having a refractive index substantially greater than the base substrate into each of the plurality of hemispherical grooves; and forming at least one electrochromic unit on the base substrate with the reflective material. The step of forming the at least one electrochromic units on the base substrate with the reflective material includes forming two transparent electrodes and providing an electrochromic material between the two transparent electrodes.

In one possible embodiment of the present disclosure, the step of forming the plurality of hemispherical grooves in the base substrate includes: forming on the base substrate a mask pattern comprising a plurality of circular hollowed-out regions arranged in an array form; etching the base substrate with the mask pattern, so as to form the plurality of hemispherical grooves in the base substrate; and removing the mask pattern.

In one possible embodiment of the present disclosure, the mask pattern is made of chromium, and the etching is isotropic wet-etching.

In one possible embodiment of the present disclosure, in the case of being in a nontransparent state, the electrochromic material is black.

In one possible embodiment of the present disclosure, subsequent to the step of forming the at least one electrochromic unit on the base substrate with the reflective material, the method further includes forming a protection layer on the base substrate with the at least one electrochromic unit.

According to the display panel, the manufacturing method thereof and the display device provided by embodiments of the present disclosure, the reflective material may be filled into the hemispherical grooves in the base substrate, the at least one electrochromic unit may be arranged on the base substrate with the reflective material, and each of the at least one electrochromic unit may include the two transparent electrodes and the electrochromic material arranged between the two transparent electrodes. As compared with a conventional display panel, it is unnecessary for the display panel in the embodiments of the present disclosure through nanoimprint lithography, thereby it is able to reduce the difficulty in the manufacture and simplify the manufacturing process.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
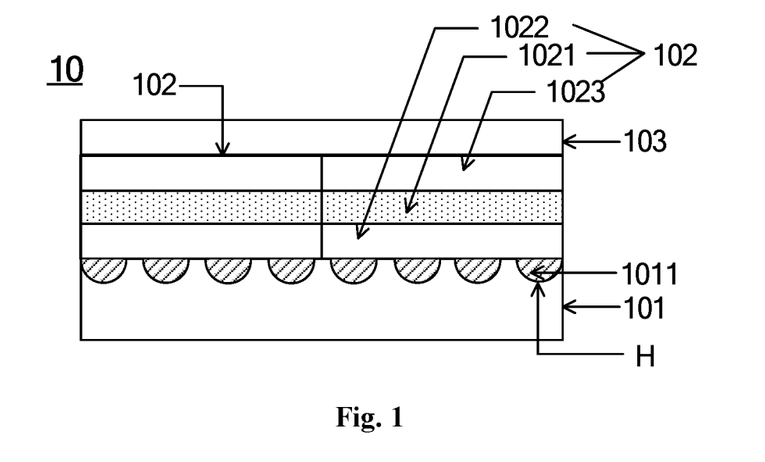
FIG. 1 is a schematic view showing a display panel according to one embodiment of the present disclosure.

The present disclosure provides in some embodiments a display panel 10 which, as shown in FIG. 1, includes: a base substrate 101; a plurality of hemispherical grooves H arranged in the base substrate 101, a reflective material 1011 having a refractive index substantially greater than the base substrate 101 being filled in each of the plurality of hemispherical grooves H; and at least one electrochromic unit 102 arranged on the base substrate 101 with the reflective material 1011. Each of the at least one electrochromic unit 102 includes two transparent electrodes and an electrochromic material 1021 arranged between the two transparent electrodes. The two transparent electrodes may include a first transparent electrode 1022 and a second transparent electrode 1023.

During the actual application, in the case that a first voltage is applied to the two transparent electrodes, the electrochromic material may be in a transparent state. At this time, an incident light beam may be transmitted through the electrochromic material to the reflective material, and then totally reflected by the reflective material. In the case that a second voltage is applied to the two transparent electrodes, the electrochromic material may be in a nontransparent state and adsorb the incident light beam. The incident light beam enters the display panel at a side of the electrochromic unit away from the base substrate.

According to the display panel in the embodiments of the present disclosure, the reflective material may be filled into the hemispherical grooves in the base substrate, the at least one electrochromic unit may be arranged on the base substrate with the reflective material, and each of the at least one electrochromic unit may include the two transparent electrodes and the electrochromic material arranged between the two transparent electrodes. As compared with a conventional display panel, it is unnecessary for the display panel in the embodiments of the present disclosure through nanoimprint lithography, thereby it is able to reduce the difficulty in the manufacture and simplify the manufacturing process.

It should be appreciated that, the reflective material 1011 is a transparent inorganic material or a transparent organic material having a relatively high refractive index, usually not smaller than 1.6. In one possible embodiment of the present disclosure, the reflective material 1011 may be zinc oxide, or a composite material of zinc oxide and sulfur. The base substrate 101 may be made of a transparent material such as glass, quartz or plastics, preferably glass. In the case of forming the base substrate 101, a material having a refractive index smaller than 1.5 may be selected, so as to ensure that the refractive index of the reflective material 1011 is greater than that of the base substrate 101.

Further, as shown in FIG. 1, the at least one electrochromic unit may include a plurality of electrochromic units 102 arranged in an array form on the base substrate 101 with the reflective material 1011. Here, two electrochromic units 102 are arranged on the base substrate 101 for example. Of course, the number of the electrochromic units 102 will not be particularly defined herein.

The plurality of electrochromic units 102 may be arranged in various modes on the base substrate 101 with the reflective material 1011, and two of them will be described hereinafter.

Figure 2:
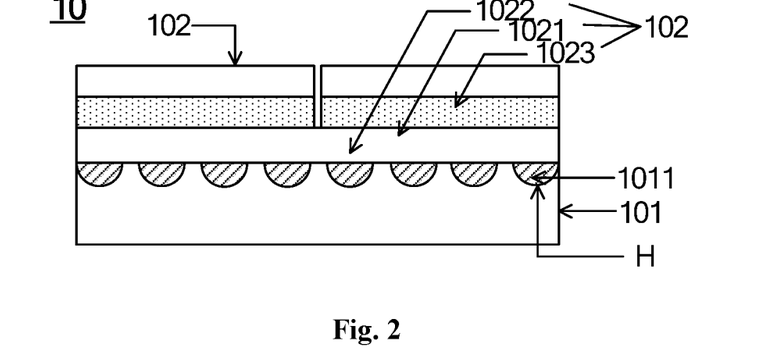
FIG. 2 is another schematic view showing the display panel according to one embodiment of the present disclosure.

In a first arrangement mode, as shown in FIG. 2, the first transparent electrodes 1022 of the plurality of electrochromic units at one side of the electrochromic material may be electrically connected to each other, and the second transparent electrodes 1023 at the other side of the electrochromic material may be spaced apart from each other. It should be appreciated that, alternatively, the first transparent electrodes 1022 may be spaced apart from each other, and the second transparent electrodes 1023 may be electrically connected to each other. The description is given by taking the arrangement mode in FIG. 2 as an example. For the transparent electrodes electrically connected to each other at one side of the electrochromic material and the transparent electrodes spaced apart from each other at the other side of the electrochromic material, the positions of these transparent electrodes will not be particularly defined herein, and the electrochromic materials 1021 may be spaced apart from each other. In one possible embodiment of the present disclosure, as shown in FIG. 2, the first transparent electrodes 1022 of the plurality of electrochromic units 102 at one side of the electrochromic material 1021 may be electrically connected to each other and formed integrally, i.e., they may form one transparent electrode. In another possible embodiment of the present disclosure, the first transparent electrodes 1022 may also be spaced apart from each other, and any two of them may be electrically connected to each other through a connection line. During the actual application, in order to ensure a display effect of the display panel, the transparent electrodes may be spaced apart from each other at a distance as small as possible (the same for the electrochromic materials), as long as the transparent electrodes spaced apart from each other in any electrochromic unit are insulated from the transparent electrodes in an adjacent electrochromic unit and the electrochromic material in any electrochromic unit are insulated from the electrochromic material in an adjacent electrochromic unit.

Figure 3A:
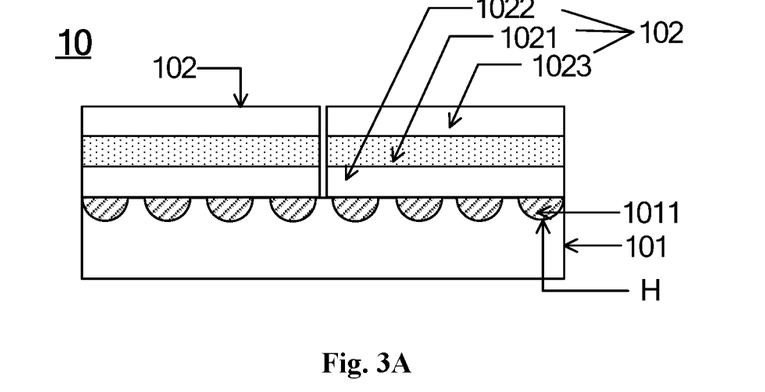
FIG. 3A is yet another schematic view showing the display panel according to one embodiment of the present disclosure.
Figure 3B:
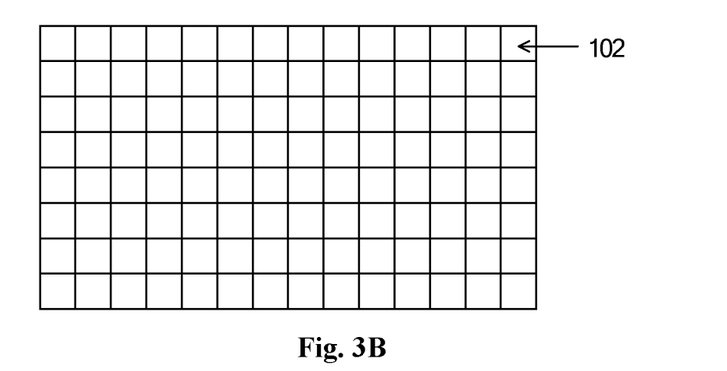
FIG. 3B is a schematic view showing an arrangement mode of electrochromic units according to one embodiment of the present disclosure.

In a second arrangement mode, as shown in FIG. 3A, any two of the plurality of electrochromic units 102 may be spaced apart from each other. As shown in FIG. 3B, the plurality of electrochromic units 102 is arranged in a matrix form on the display panel. During the actual application, in order to ensure the display effect of the display panel, the electrochromic units may be spaced apart from each other at a distance as small as possible, as long as the electrochromic units are insulated from each other.

To be specific, each electrochromic unit 102 may be switched between two display states, i.e., a bright state and a dark state, by changing a color of the electrochromic material 1021 in the electrochromic unit 102.

Figure 4:
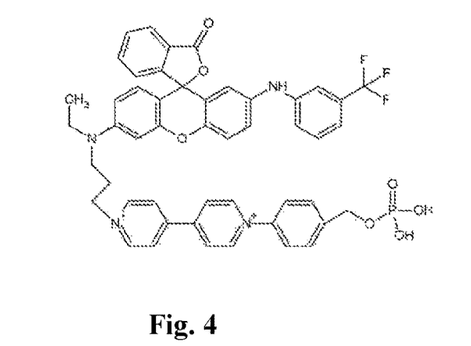
FIG. 4 is a structural formula of an electrochromic material according to one embodiment of the present disclosure.

In one possible embodiment of the present disclosure, the electrochromic material 1021 may be a metal oxide or an organic compound. In the embodiments of the present disclosure, the electrochromic material may have a structural formula as shown in FIG. 4.

Figure 5A:
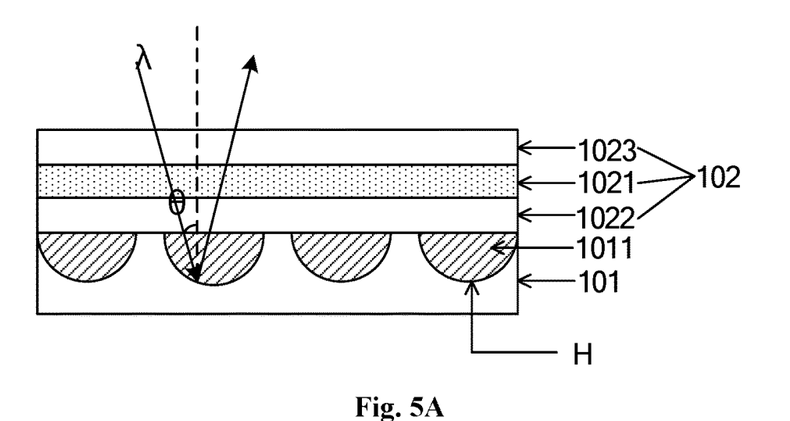
FIG. 5A is a schematic view showing a working principle of the display panel according to one embodiment of the present disclosure.

In a first display state, as shown in FIG. 5A, in the case that the first voltage is applied to the two transparent electrodes, the electrochromic material 1021 may be in a transparent state, so an incident light beam λ may be transmitted through the electrochromic material 1021 to the reflective material 1011. The reflective material 1011 has a refractive index substantially greater than the base substrate 101, and in the case that an incident angle θ of the incident light beam λ is greater than a critical angle (sin θ≥the refractive index of the base substrate/the refractive index of the reflective material), the incident light beam λ may be totally reflected by the reflective material 1011. At this time, the electrochromic unit 102 may be in the bright state. It should be appreciated that the first voltage may be 0V. For example, the two transparent electrodes may be grounded, or an identical voltage may be applied to the two transparent electrodes.

Figure 5B:
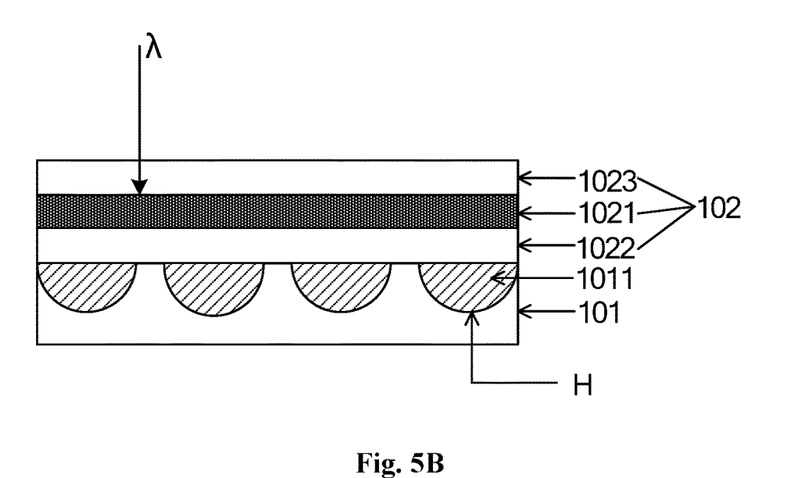
FIG. 5B is another schematic view showing the working principle of the display panel according to one embodiment of the present disclosure.

In a second display state, as shown in FIG. 5B, in the case that the second voltage is applied to the two transparent electrodes, the electrochromic material 1021 may be in a nontransparent state and absorb the incident light beam λ. At this time, the electrochromic unit 102 may be in the dark state. In one possible embodiment of the present disclosure, in the case of being in the nontransparent state, the electrochromic material 1021 may be black. In the embodiments of the present disclosure, the color of the electrochromic material in the case of the nontransparent state will not be particularly defined, and preferably it is black. It should be appreciated that, the description is given by taking the electrochromic material being black in the case of being in the nontransparent state as an example, i.e., by taking the organic compound in FIG. 4 an example. In the case that the second voltage is applied to the two transparent electrodes, the electrochromic material 1021 may be gradually changed from transparent to black along with an increase in the second voltage. At this time, the proportion of the incident light beam Xλ absorbed thereby may increase, and the display panel 10 may be gradually switched from the bright state to the dark state. Furthermore, in the case that the second voltage is 3 V, the electrochromic material 1021 may be completely black. At this time, the incident light beam λ may be totally absorbed and the electrochromic unit 102 may be in the dark state.

Figure 5C:
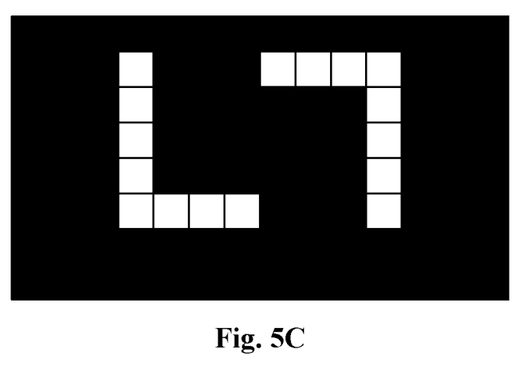
FIG. 5C is a schematic view showing a pattern displayed on the display panel according to one embodiment of the present disclosure.
Figure 5D:
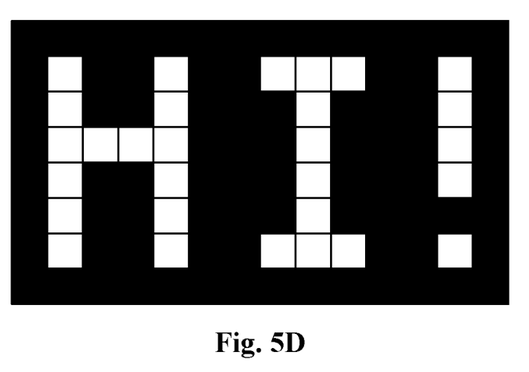
FIG. 5D is another schematic view showing a pattern displayed on the display panel according to one embodiment of the present disclosure.

During the actual application, by controlling the state of the electrochromic unit 102, it is able to display the patterns as shown in FIGS. 5C and 5D on the display panel in FIG. 3B.

It should be appreciated that, the incident light beam λ may enter the display panel at a side of the electrochromic unit 102 away from the base substrate 101.

To be specific, in the case that the voltage is applied to the two transparent electrodes, it may be controlled by a passive matrix electrode. To be specific, in the presence of two transparent electrodes, the first transparent electrode may be arranged in a direction substantially perpendicular to the second transparent electrode. The electrochromic units may be selected through a row/column selection line, so as to control the voltage applied to each electrochromic unit. In one possible embodiment of the present disclosure, the voltage may also be controlled by an active matrix electrode. To be specific, at least one of the two transparent electrodes may be electrically connected to a Thin Film Transistor (TFT), so as to control the voltage through the TFT.

In one possible embodiment of the present disclosure, as shown in FIG. 1, a protection layer 103 may be further arranged on the base substrate 101 with the at least one electrochromic unit 102, so as to protect the electrochromic unit from abrasion, thereby to prolong a service life of the display panel.

According to the display panel in the embodiments of the present disclosure, the reflective material may be filled into the hemispherical grooves in the base substrate, the at least one electrochromic unit may be arranged on the base substrate with the reflective material, and each of the at least one electrochromic unit may include the two transparent electrodes and the electrochromic material arranged between the two transparent electrodes. It is able to control the voltage applied to the transparent electrodes, so as to change the color of the electrochromic material in the electrochromic unit, thereby to switch display panel between the bright state and the dark state. As compared with a conventional display panel, it is unnecessary for the display panel in the embodiments of the present disclosure through nanoimprint lithography, thereby it is able to reduce the difficulty in the manufacture and simplify the manufacturing process. In addition, through filling the electrochromic material in the hemispherical grooves in the base substrate, it is able to reduce a thickness of the display panel. The black charged particles are replaced with the electrochromic material, it is able to prevent the occurrence of aggregation of the black charged particles, thereby to further improve the display performance of the display panel.

The present disclosure further provides in some embodiments a display device including the above-mentioned display panel as shown in FIGS. 1 to 3A.

Figure 6:
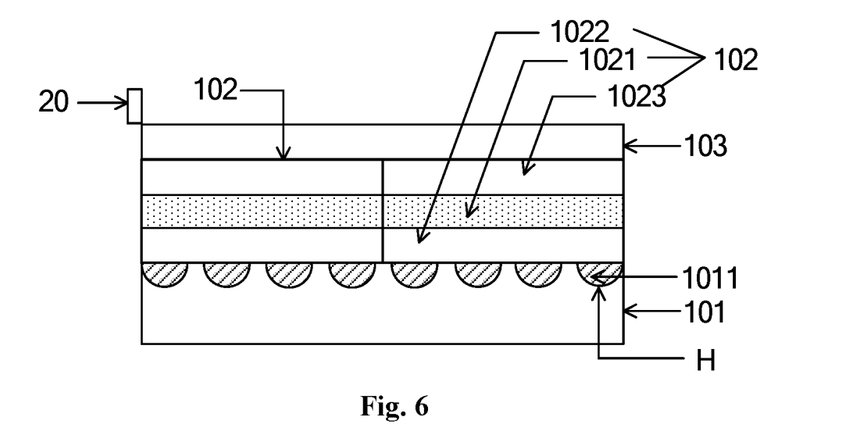
FIG. 6 is a schematic view showing a display device according to one embodiment of the present disclosure.

In one possible embodiment of the present disclosure, as shown in FIG. 6, the display device (not shown) may further include a preposed light source 20 arranged at a light-entering side of the display panel and at at least one end of the display panel. It should be appreciated that, the light-entering side refers to a side of the electrochromic unit 102 away from the base substrate 101. In the case that the display device is located in a bright environment, an ambient light beam may serve as the incident light beam. In addition, in the case that the display device is located in a dark environment, the preposed light source 20 may be turned on, so as to provide the incident light beam for the display device. During the actual application, a light sensor may be arranged in the display device, so as to determine an intensity of the ambient light beam. In the case that the intensity of the ambient light beam is greater than or equal to a predetermined threshold, the ambient light beams may be served as incident light beams by the display device. In addition, in the case that the intensity of the ambient light beam is smaller than the predetermined threshold, the preposed light source may be turned on so as to provide the incident light beam for the display device.

During the implementation, the display device in the embodiments of the present disclosure may be any product or member having a display function, such as a mobile phone, a flat-panel computer, a television, a display, a laptop computer, a digital photo frame or a navigator.

According to the display device in the embodiments of the present disclosure, the reflective material may be filled into the hemispherical grooves in the base substrate, the at least one electrochromic unit may be arranged on the base substrate with the reflective material, and each of the at least one electrochromic unit may include the two transparent electrodes and the electrochromic material arranged between the two transparent electrodes. As compared with a conventional display panel, it is unnecessary for the display panel in the embodiments of the present disclosure through nanoimprint lithography, thereby it is able to reduce the difficulty in the manufacture and simplify the manufacturing process.

Figure 7:
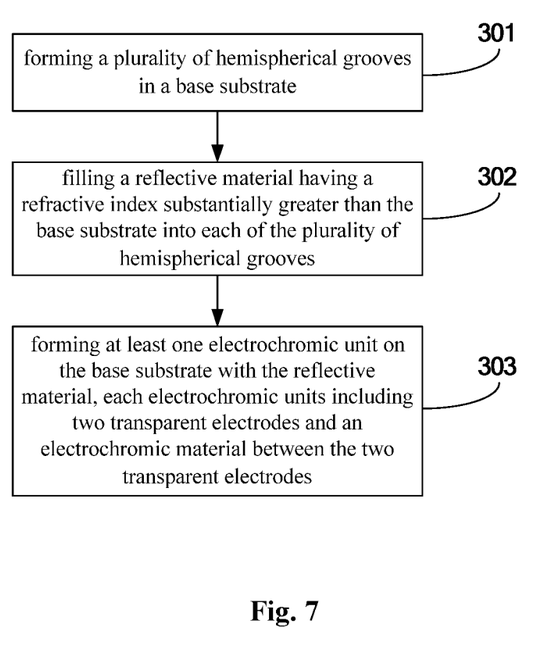
FIG. 7 is a flow chart of a method for manufacturing the display panel according to one embodiment of the present disclosure.

The present disclosure further provides in some embodiments a method for manufacturing a display panel which, as shown in FIG. 7, includes: Step 301 of forming a plurality of hemispherical grooves in a base substrate; Step 302 of filling a reflective material having a refractive index substantially greater than the base substrate into each of the plurality of hemispherical grooves; and Step 303 of forming at least one electrochromic unit on the base substrate with the reflective material. The step of forming the at least one electrochromic units on the base substrate with the reflective material includes forming two transparent electrodes and providing an electrochromic material between the two transparent electrodes.

During the actual application, in the case that a first voltage is applied to the two transparent electrodes, the electrochromic material may be in a transparent state. At this time, an incident light beam may be transmitted through the electrochromic material to the reflective material, and then totally reflected by the reflective material. In the case that a second voltage is applied to the two transparent electrodes, the electrochromic material may be in a nontransparent state and adsorb the incident light beam. The incident light beam enters the display panel at a side of the electrochromic unit away from the base substrate.

According to the method for manufacturing the display panel in the embodiments of the present disclosure, the reflective material may be filled into the hemispherical grooves in the base substrate, the at least one electrochromic unit may be arranged on the base substrate with the reflective material, and each of the at least one electrochromic unit may include the two transparent electrodes and the electrochromic material arranged between the two transparent electrodes. As compared with a conventional display panel, it is unnecessary for the display panel in the embodiments of the present disclosure through nanoimprint lithography, thereby it is able to reduce the difficulty in the manufacture and simplify the manufacturing process.

Figure 8A:
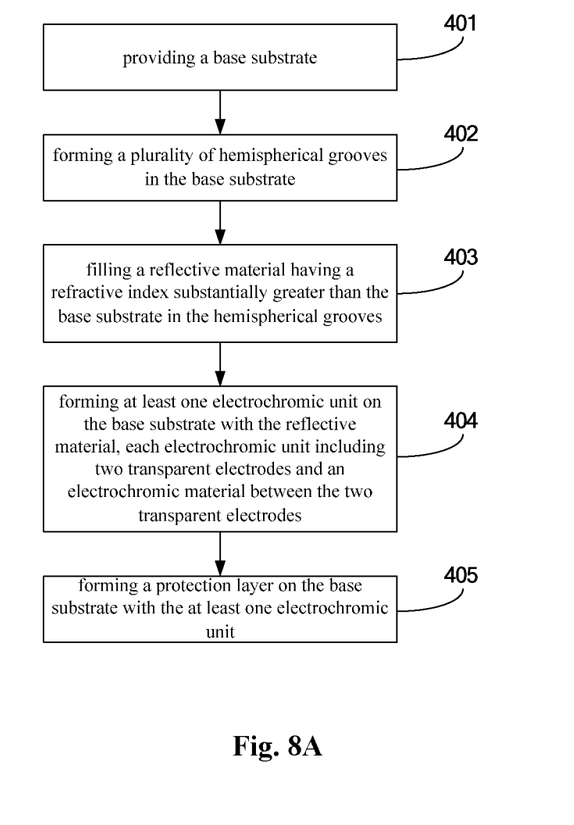
FIG. 8A is another flow chart of the method for manufacturing the display panel according to one embodiment of the present disclosure.

The present disclosure further provides in some embodiments a method for manufacturing a display panel which, as shown in FIG. 8A, may include the following steps.

Step 401: providing a base substrate. The base substrate may be made of a transparent material such as glass, quartz or plastics, and preferably glass.

Figure 8B:
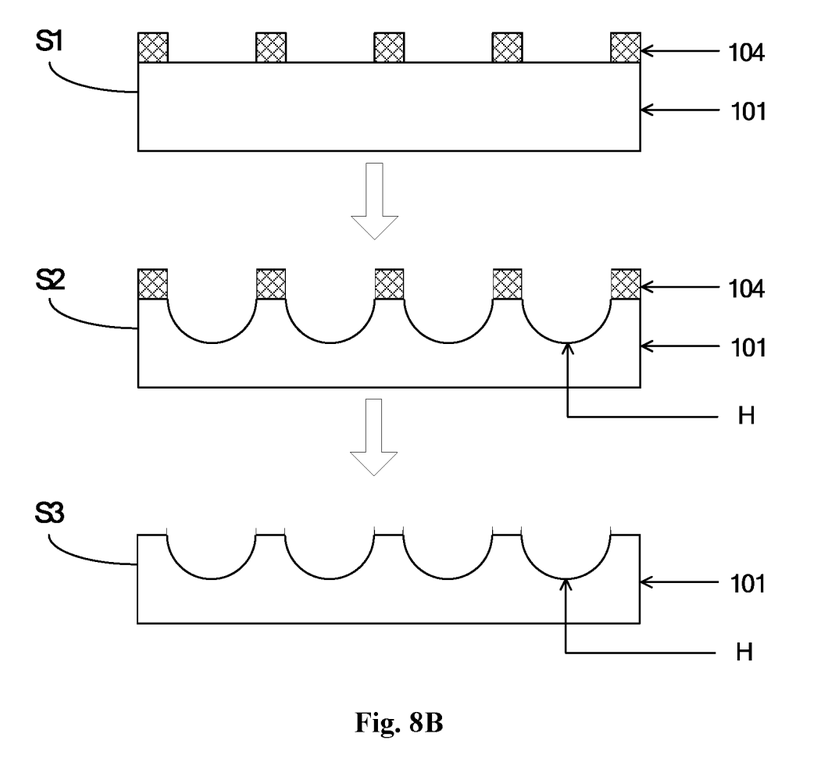
FIG. 8B is a schematic view showing the formation of hemispherical grooves in a base substrate according to one embodiment of the present disclosure.

Step 402: forming a plurality of hemispherical grooves in the base substrate. To be specific, as shown in FIG. 8B, Step 402 may include the following steps.

Step S1: forming a mask pattern 104 on the base substrate 101. The mask pattern 104 may include a plurality of circular hollowed-out regions arranged in an array form. To be specific, a mask layer may be formed on the base substrate 101 through deposition, coating or sputtering. In one possible embodiment of the present disclosure, the mask layer may be made of chromium. Next, the mask layer may be patterned by a single patterning process to form the mask pattern 104, and the patterning process may include the steps of applying a photoresist, exposing and developing the photoresist, etching the mask layer and removing the photoresist. It should be appreciated that the material of the mask layer will not be particularly defined herein.

Figure 8C:
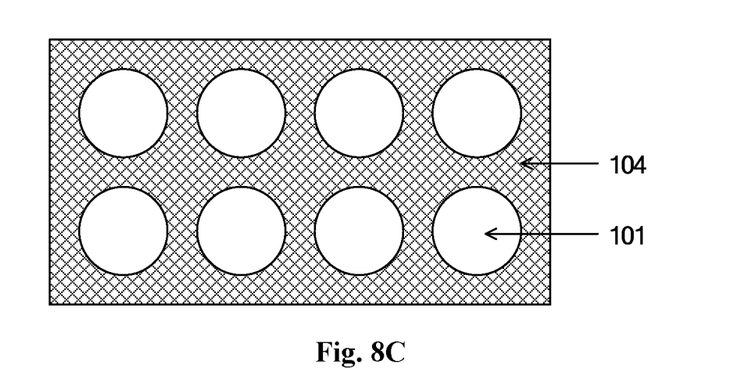
FIG. 8C is a schematic view showing a mask pattern according to one embodiment of the present disclosure.

In one possible embodiment of the present disclosure, as shown in FIG. 8C, the plurality of circular hollowed-out regions arranged in an array form on the mask pattern may be discontinuous. However, whether or not the circular hollowed-out regions are arranged continuously on the mask pattern will not be particularly defined herein.

Step S2: etching the base substrate 101 with the mask pattern 104, so as to form the plurality of hemispherical grooves H in the base substrate 101. To be specific, the base substrate 101 with the mask pattern 104 may be etched through an isotropic wet-etching method so as to form the plurality of hemispherical grooves H. An etchant may include a mixture of nitric acid and hydrofluoric acid ($HNO_3$—HF—$H_2O$). In one possible embodiment of the present disclosure, a dry-etching method may also be adopted to etch the base substrate 101 with the mask pattern 104. In other words, the etching method will not be particularly defined herein.

Step S3: removing the mask pattern 104.

Step 403: filling a reflective material having a refractive index substantially greater than the base substrate in the hemispherical grooves.

It should be appreciated that, the reflective material filled into the hemispherical grooves is a transparent inorganic material or a transparent organic material having a relatively high refractive index, usually not smaller than 1.6. In one possible embodiment of the present disclosure, the reflective material may be zinc oxide, or a composite material of zinc oxide and sulfur. The base substrate may be made of a transparent material such as glass, quartz or plastics, preferably glass. In the case of manufacturing the base substrate, a material having a refractive index smaller than 1.5 may be selected, so as to ensure that the refractive index of the reflective material is greater than that of the base substrate.

Step 404: forming at least one electrochromic unit on the base substrate with the reflective material. Each electrochromic unit includes two transparent electrodes and an electrochromic material between the two transparent electrodes. To be specific, each electrochromic unit may be switched between two display states, i.e., a bright state and a dark state, by changing a color of the electrochromic material in the electrochromic unit.

In a first display state, as shown in FIG. 5A, in the case that the first voltage is applied to the two transparent electrodes, the electrochromic material 1021 may be in a transparent state, so an incident light beam $\lambda$ may be transmitted through the electrochromic material 1021 to the reflective material 1011. The reflective material 1011 has a refractive index substantially greater than the base substrate 101, and in the case that an incident angle θ of the incident light beam $\lambda$ is greater than a critical angle (sin θ≥the refractive index of the base substrate/the refractive index of the reflective material), the incident light beam $\lambda$ may be totally reflected by the reflective material 1011. At this time, the electrochromic unit 102 may be in the bright state. It should be appreciated that the first voltage may be 0V. For example, the two transparent electrodes may be grounded, or an identical voltage may be applied to the two transparent electrodes.

In a second display state, as shown in FIG. 5B, in the case that the second voltage is applied to the two transparent electrodes, the electrochromic material 1021 may be in a nontransparent state and absorb the incident light beam $\lambda$. At this time, the electrochromic unit 102 may be in the dark state. In one possible embodiment of the present disclosure, in the case of being in the nontransparent state, the electrochromic material 1021 may be black. In the embodiments of the present disclosure, the color of the electrochromic material in the case of the nontransparent state will not be particularly defined, and preferably it is black. It should be appreciated that, the description is given by taking the electrochromic material being black in the case of being in the nontransparent state as an example, i.e., by taking the organic compound in FIG. 4 an example. In the case that the second voltage is applied to the two transparent electrodes, the electrochromic material 1021 may be gradually changed from transparent to black along with an increase in the second voltage. At this time, the proportion of the incident light beam $\lambda$ absorbed thereby may increase, and the display panel 10 may be gradually switched from the bright state to the dark state. Furthermore, in the case that the second voltage is 3 V, the electrochromic material 1021 may be completely black. At this time, the incident light beam $\lambda$ may be totally absorbed and the electrochromic unit 102 may be in the dark state.

During the actual application, by changing the display state of the electrochromic unit 102, it is able to display a black-and-white image, e.g., a white character on a black ground or a black character on a white ground. For example, the patterns as shown in FIGS. 5C and 5D may be displayed on the display panel. Such a display mode may be applied to electronic books, so as to achieve an excellent visual effect.

It should be appreciated that, the incident light beam $\lambda$ may enter the display panel at a side of the electrochromic unit away from the base substrate.

To be specific, in the case that the voltage is applied to the two transparent electrodes, it may be controlled by a passive matrix electrode. To be specific, in the presence of two transparent electrodes, the first transparent electrode may be arranged in a direction substantially perpendicular to the second transparent electrode. The electrochromic units may be selected through a row/column selection line, so as to control the voltage applied to each electrochromic unit. In one possible embodiment of the present disclosure, the voltage may also be controlled by an active matrix electrode. To be specific, at least one of the two transparent electrodes may be electrically connected to a TFT, so as to control the voltage through the TFT.

It should be appreciated that, during the manufacture of the at least one electrochromic unit, the plurality of electrochromic units at one identical layer may be formed through one single process. For example, the first transparent electrodes of the plurality of electrochromic units may be formed on the base substrate through one single process (e.g., a single patterning process), next the electrochromic materials of the plurality of electrochromic units may be formed through another single process (e.g., a single coating process), and then the second transparent electrodes of the plurality of electrochromic units may be formed on the electrochromic materials through another single process (e.g., a single patterning process). The above method for forming the electrochromic units is for illustrative purpose only, and any modifications, equivalent substitutions or improvements made without departing from the spirit and principle of the present disclosure may also fall within the scope of the present disclosure. The single patterning process may include the steps of applying a photoresist, exposing and developing the photoresist, etching a corresponding layer and removing the photoresist.

Step 405: forming a protection layer on the base substrate with the at least one electrochromic unit. It should be appreciated that, as shown in FIG. 1, the protection layer 103 may be formed on the base substrate 101 with the at least one electrochromic unit 102, so as to protect the electrochromic unit from abrasion, thereby to prolong a service life of the display panel.

According to the method for manufacturing the display panel in the embodiments of the present disclosure, the reflective material may be filled into the hemispherical grooves in the base substrate, the at least one electrochromic unit may be arranged on the base substrate with the reflective material, and each of the at least one electrochromic unit may include the two transparent electrodes and the electrochromic material arranged between the two transparent electrodes. It is able to control the voltage applied to the transparent electrodes, so as to change the color of the electrochromic material in the electrochromic unit, thereby to switch display panel between the bright state and the dark state. As compared with a conventional display panel, it is unnecessary for the display panel in the embodiments of the present disclosure through nanoimprint lithography, thereby it is able to reduce the difficulty in the manufacture and simplify the manufacturing process. In addition, through filling the electrochromic material in the hemispherical grooves in the base substrate, it is able to reduce a thickness of the display panel. The black charged particles are replaced with the electrochromic material, it is able to prevent the occurrence of aggregation of the black charged particles, thereby to further improve the display performance of the display panel.

It should be appreciated that, for ease of description, the specific procedures of the method for manufacturing the display panel may refer to those mentioned in the above embodiments of the display panel, and thus will not be particularly defined herein.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display panel, comprising:
    a base substrate;
    a plurality of hemispherical grooves arranged in the base substrate, a reflective material having a refractive index substantially greater than the base substrate being filled in each of the plurality of hemispherical grooves; and
    at least one electrochromic unit arranged on the base substrate with the reflective material,
    wherein each of the at least one electrochromic unit comprises two transparent electrodes and an electrochromic material arranged between the two transparent electrodes.

2. The display panel according to claim 1, wherein the at least one electrochromic unit comprises a plurality of electrochromic units arranged in an array form on the base substrate with the reflective material.

3. The display panel according to claim 2, wherein the transparent electrodes of the plurality of electrochromic units at one side of the electrochromic material are electrically connected to each other, and the transparent electrodes at the other side of the electrochromic material are spaced apart from each other.

4. The display panel according to claim 3, wherein the transparent electrodes of the plurality of electrochromic units at the one side of the electrochromic material are formed integrally.

5. The display panel according to claim 2, wherein any two of the plurality of electrochromic units are spaced apart from each other.

6. The display panel according to claim 1, wherein in the case of being in a nontransparent state, the electrochromic material is black.

7. The display panel according to claim 1, wherein a protection layer is further arranged on the base substrate with the at least one electrochromic unit.

8. The display panel according to claim 1, wherein the reflective material is zinc oxide, or a composite material of zinc oxide and sulfur.

9. A display device, comprising a display panel, wherein the display panel comprises: a base substrate; a plurality of hemispherical grooves arranged in the base substrate, a reflective material having a refractive index substantially greater than the base substrate being filled in each of the plurality of hemispherical grooves; and at least one electrochromic unit arranged on the base substrate with the reflective material, wherein each of the at least one electrochromic unit comprises two transparent electrodes and an electrochromic material arranged between the two transparent electrodes.

10. The display device according to claim 9, further comprising a preposed light source arranged at a light-entering side of the display panel and on at least one end of the display panel.

11. The display device according to claim 9, wherein the at least one electrochromic unit comprises a plurality of electrochromic units arranged in an array form on the base substrate with the reflective material;
    the transparent electrodes of the plurality of electrochromic units at one side of the electrochromic material are electrically connected to each other, and the transparent electrodes at the other side of the electrochromic material are spaced apart from each other; and
    the transparent electrodes of the plurality of electrochromic units at the one side of the electrochromic material are formed integrally.

12. The display device according to claim 11, wherein any two of the plurality of electrochromic units are spaced apart from each other.

13. The display device according to claim 9, wherein in the case of being in a nontransparent state, the electrochromic material is black.

14. The display device according to claim 9, wherein a protection layer is further arranged on the base substrate with the at least one electrochromic unit.

15. The display device according to claim 9, wherein the reflective material is zinc oxide, or a composite material of zinc oxide and sulfur.

16. A method for manufacturing a display panel, comprising steps of:
    forming a plurality of hemispherical grooves in a base substrate;
    filling a reflective material having a refractive index substantially greater than the base substrate into each of the plurality of hemispherical grooves; and
    forming at least one electrochromic unit on the base substrate with the reflective material,
    wherein the step of forming the at least one electrochromic units on the base substrate with the reflective material comprises: forming two transparent electrodes and providing an electrochromic material between the two transparent electrodes.

17. The method according to claim 16, wherein the step of forming the plurality of hemispherical grooves in the base substrate comprises:
    forming on the base substrate a mask pattern comprising a plurality of circular hollowed-out regions arranged in an array form;
    etching the base substrate with the mask pattern, so as to form the plurality of hemispherical grooves in the base substrate; and
    removing the mask pattern.

18. The method according to claim 17, wherein the mask pattern is made of chromium, and the etching is isotropic wet-etching.

19. The method according to claim 16, wherein in the case of being in a nontransparent state, the electrochromic material is black.

20. The method according to claim 16, wherein subsequent to the step of forming the at least one electrochromic unit on the base substrate with the reflective material, the method further comprises: forming a protection layer on the base substrate with the at least one electrochromic unit.

\* \* \* \* \*